United States Patent

[11] 3,611,346

[72] Inventors Robert D. Stoddard
Reeds Ferry;
Arnold Schumacher, Amherst; John R. Longland, Nashua, all of N.H.

[21] Appl. No. 817,786
[22] Filed Apr. 21, 1969
[45] Patented Oct. 5, 1971
[73] Assignee Sanders Associates, Inc.
Nashua, N.H.

[54] VARIABLE RATE LINE GENERATOR
7 Claims, 3 Drawing Figs.

[52] U.S. Cl. ........ 340/324 A, 315/18, 315/29, 328/157
[51] Int. Cl. ........ G06f 3/14
[50] Field of Search ........ 340/324 A; 328/157; 315/18, 29

[56] References Cited
UNITED STATES PATENTS

| | | | |
|---|---|---|---|
| 3,320,409 | 5/1967 | Larrowe | 340/324 UX |
| 3,325,802 | 6/1967 | Bacon | 340/324 |
| 3,329,948 | 7/1967 | Halsted | 340/324 |

*Primary Examiner*—John W. Caldwell
*Assistant Examiner*—David L. Trafton
*Attorney*—Louis Etlinger

ABSTRACT: A computer controlled multistation display system utilizing a single display generator unit time shared by display indicators which have different writing rates. The display generator includes a register bank which receives and holds display indicator select and writing rate information as well as symbol tracing information. A control section routes the display select information to a display selector and the writing rate and the symbol tracing information to a function generator which produces X-, Y- and Z-axis modulating signals at a rate which corresponds to the writing rate information. The display selector routes the generated X, Y and Z signals to a display indicator having a writing rate corresponding to the rate at which the X, Y and Z signals are produced. The function generator is illustrated as including a line generator having circuitry for varying the rate at which lines or vectors are written on the display surface of the indicator.

INVENTORS
ROBERT D. STODDARD
ARNOLD SCHUMACHER
JOHN R. LONGLAND
BY
Robert R. Hubbard
ATTORNEY INVENTORS
ROBERT D. STODDARD
ARNOLD SCHUMACHER
JOHN R. LONGLAND
BY
Robert R. Hubbard
ATTORNEY

VARIABLE RATE LINE GENERATOR

BACKGROUND OF THE INVENTION

This invention relates to information systems and in particular to techniques and apparatus for providing display of information.

One type of present day information system employs a cathode-ray tube (CRT)-type indicator which is driven by a suitable signal source of X, Y and Z modulation. The signal source in some applications takes the a display of a simple video source including sweep controls, such as radar or television. In other applications, the signal source takes the form of a digital computer which controls the visual presentation of symbolic data (alphanumeric, lines, conics and the like) on the CRT screen. In some applications the digitally generated symbolic data can be mixed with video under the control of the computer.

In many computer controlled display systems, the computer has stored in its memory an instruction set indicative of a symbolic set to be displayed. The instruction set is applied at a suitable refresh rate to a display generator which responds to the instructions to generate the X, Y, and Z modulation indicative of the set of symbols. The X, Y and Z modulation is then applied to the CRT indicator to present a visual display of the symbol set. The computer generally responds to various input devices, such as keyboards, light-guns, sensing devices, and others so as to update the instruction set in real time (i.e., a relatively short response time).

Computer controlled display systems have generally employed various types of CRT indicators. Where large amounts of data are to be presented at one time, high-speed indicators (on the order of 500,000 inches per second writing rate) have been employed. In other cases, CRT projection-type indicators (on the order of 250,000 inches per second) have been employed. In still other cases, CRT hard copy indicators (on the order of 5,000 to 10,000 inches per second) have been employed. In general, each such display has required a separate display generator and a separate refresh channel to the computer memory. Because of this, multistation display environments have not been able to efficiently monitor data on a real time basis.

Multistation real time display system environments, such as automatic checkout systems, human factor study systems, simulation systems educational training systems, avionic systems and others, generally require different visual presentations of the data content for different purposes. For instance, an automatic checkout system for an aircraft may require that a large amount of dynamically changing data be displayed on a single indicator at one station. For this purpose, a high-speed indicator may be employed. At another station, only a portion of the data may be required to be displayed on a CRT projection-type indicator. At still other stations, a portion of the data may be required to be displayed on a CRT hard copy unit.

BRIEF SUMMARY OF THE INVENTION

An object of the present invention is to provide a novel and improved line generator capable of dynamically shifting over a wide range of generating rates.

Another object of the present invention is to provide a computer controlled variable rate line generator.

Yet another object is to provide a variable rate line generator which is time shared by plural display indicators having different writing rates.

Briefly, the variable rate line generator of the present invention is embodied in a computer controlled display generator which responds to an instruction set provided by the computer to generate driving energy at variable rates for one or more display indicators. The line generator includes means responsive to the instruction set for producing X- and Y-axis modulating signals and a rate varying means also responsive to the instruction set and coupled to the X- and Y-signal producing means to vary the rate at which the X and Y signals are produced. The signal-providing means produces a sequence of different valued constant currents. A ramp generator receives the constant current sequence and generates a like sequence of voltage ramps which sweep between first and second voltage values and which have different slopes for each different current value. The rate-varying means is coupled to the ramp generator so as to change the slopes of the voltage ramp sequence and hence the rate at which the ramp signals are produced.

BRIEF DESCRIPTION OF THE DRAWINGS

In the drawings like reference characters denote like structural elements, and

DESCRIPTION OF PREFERRED EMBODIMENTS

Figure 1:
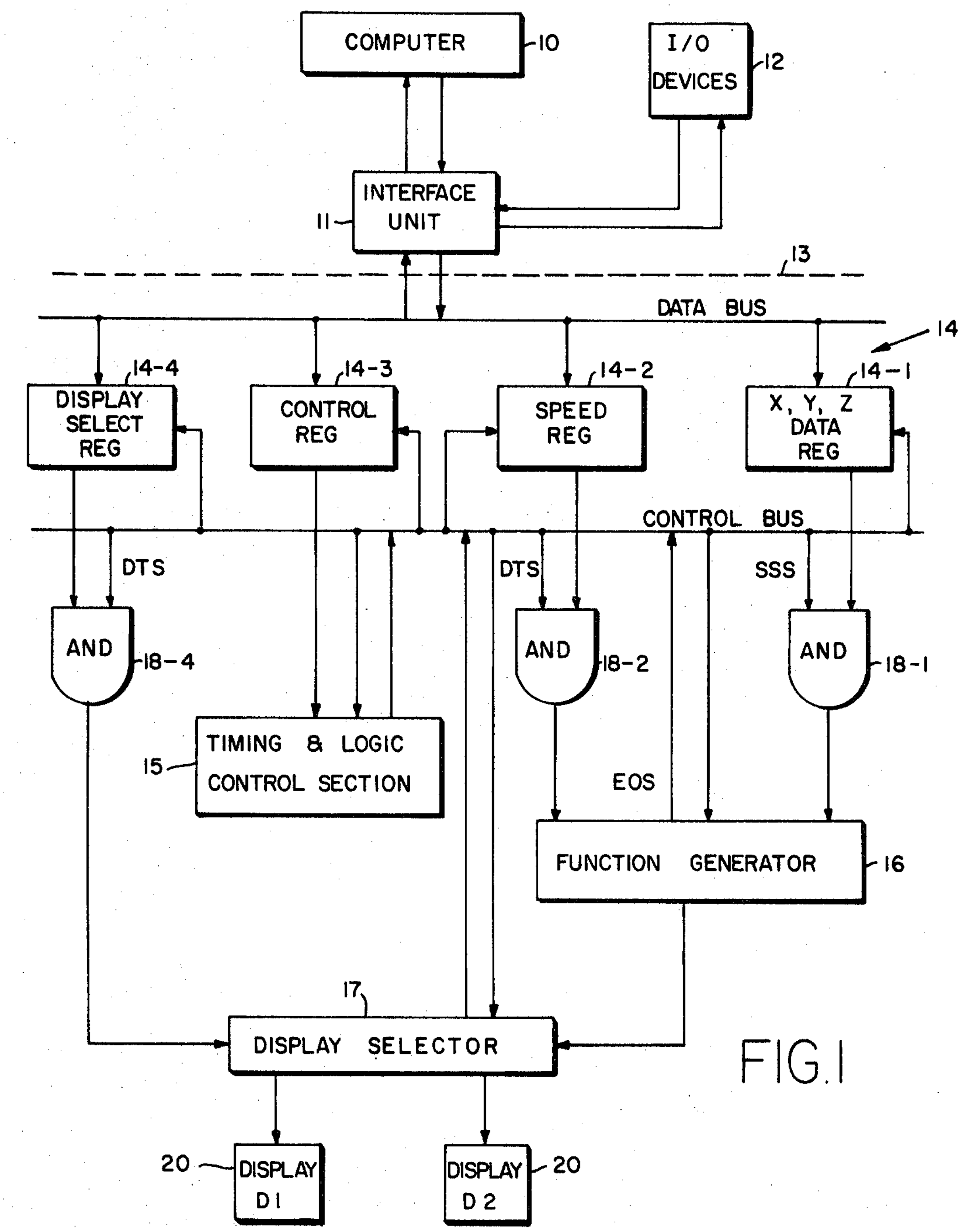
FIG. 1 is a block diagram of a computer-controlled display apparatus embodying the present invention.

Referring to FIG. 1 an information display system embodying the invention is illustrated as including a digital computer 10 associated with an interface unit 11 by way of which computer 10 communicates with various input—output (I/O) devices 12 and display generation apparatus 13 (shown below the dashed line). In FIG. 1, communication buses or data flow paths are illustrated as single lines. However, it is to be understood that each such bus or path may consist of a large number of conductors. For example, the DATA BUS consists of a number of conductors equal to the number of bits in a word. In addition where such a bus or path is applied as an input to a gate, it is assumed that the gate actually consists of a number of gates equal to the number of bits carried by the bus or path, such that each bit is applied to a different gate.

The computer 10 has a memory in which is stored in digital form instructions for producing various patterns of X, Y and Z modulation for application to plural display indicator channels 20. Although only two such channels designated D1 and D2 are illustrated, it is to be understood that many more channels may be employed. The illustrated display indicators are, for the purpose of example, considered to be CRT-type indicators having different beam deflection speed ranges. Thus, indicator D1 has a deflection (writing) speed of W1 and D2 has a writing speed of W2.

The display generation apparatus 13 fetches the instructions from the memory of computer 10, processes the instructions, generates X, Y and Z modulation, and selects which one of the display indicators D1 or D2 is to be connected to receive the X, Y and Z modulation.

Each set of instructions in the memory of computer 10 is updatable by means of a stored program contained therein and by means of various peripheral devices 12, for example, light-guns, tape or card-reader devices, keyboard devices and the like. The updating or current sensor data is coupled via an interface unit 11 to computer 10 where it is processed according to the stored program to update the instruction set.

The display generator 13 includes a register section 14, a timing and logic control section 15, a function generator 16 and a display selector 17. The instructions are fetched from the memory of computer 10 under the control of the timing and control section 15. To this end, the register section 14 includes a control register means 14–3 for receiving the instructions from computer 10 via a DATA BUS and interface unit 11. The timing and control section 15 then processes or interprets the received instructions. The instructions may require data contained therein to be loaded into various ones of the registers in section 14 and/or may require various beam deflection patterns to be generated. The timing and logic section 15 responds to the instructions to cause the data to be loaded into the specified registers as well as to cause the function generator 16 to generate the specified beam deflection patterns and the display selector 17 to select one of the indicators D1 or D2 to receive the generated beam deflection pattern. For this purpose a CONTROL BUS is shown in FIG. 1 to receive control information from control section 15 and to translate such information to various ones of the registers in section 14, or to the function generator 16 or to the display selector 17, as required. In addition, the CONTROL BUS is adapted to receive other control signals from the various parts of the display generator and to translate such other control signals to the timing and logic section 13. These other control signals may represent response status information, such as end of character and end of line generation by the function generator.

Although the control register 14–3 is illustrated as a single block, it is to be understood that the control register may include a number of registers. For example, the control register may include a memory data register for receiving incoming instructions from the computer 10, an instruction register for holding a current instruction while it is being processed and a memory address register for holding the address of the next instruction to be fetched. In addition, the control register may include other registers associated with the modification of the memory address register and still other registers associated with the timing, frame synchronization, and the operation mode of the display generator 13.

Each beam deflection pattern to be applied to either of the CRT indicators D1 and D2 must be repetitively generated (refreshed) in order to present a continuous (nonflickering) visual display. By way of example for a 60 hertz refresh rate, display generator 13 must fetch the set of instructions from computer 10 and process them to generate X, Y and Z modulation 60 times every second or once every 16.6 milliseconds. To this end, the display generator 13 includes a frame sync or refresh generator (not shown) which provides a refresh clock or sync signal to operate the control section 15 and hence, the display generator at a 60 hertz rate or other suitable rate.

A feature of the present invention is that the display generator 13 can be time shared by the different writing rate indicators D1 and D2 in contrast to prior art systems where separate display generators are required for each such indicator. To this end, the register section 14 includes a display select register 14–4, a speed register 14–2 as well as an X-, Y- and Z-register means 14–1. The register means 14–1 is employed in the conventional manner as a buffer and holding register means for the X, Y and Z data indicative of a particular symbol (either alphanumeric, line, or conic) or of a simple beam deflection positioning move in which the beam is ordinarily blanked. The display select register 14–4 is employed to hold a digital number or bit field indicative of the display indicator D1 or D2 to be selected. The speed register 14–2 is employed to hold a bit field indicative of the writing rate for the selected indicator and as such controls the rate at which the X and Y deflection signals and the Z unblanking signal are generated. That is, the slopes of the X and Y beam deflection voltages are determined, in part, by the bit field of the speed register 14–2.

A typical operational sequence would be to first load the display select and speed registers 14–4 and 14–2, respectively. When the loading operation has been completed, the timing section 15 transmits a data transfer signal DTS by way of the CONTROL BUS to AND gates 18–4. The DTS signal enables AND gates 18–4 to pass the display select bit field to the display selector 17. The display selector 17 is, for example, a crossbar-type switch which responds to the display select bits to connect one of the indicators D1 or D2, say D1, to the output of the function generator 16.

The DTS signal also enables AND gates 18–2 to pass the writing rate bit field to the function generator 16. The writing rate bit field conditions the function generator to generate X, Y and Z signals corresponding to the X, Y and Z digital data at a specific generating rate corresponding to the value W1 of the field. The X, Y and Z data for a desired symbol are then loaded into the X-, Y- and Z-register means 14–1. After this loading operation is staticized, the timing and control section 15 transmits a symbol start signal SSS to enable AND gates 18–1 to pass the X, Y and Z data to the function generator 16. The function generator 16 then responds to the X, Y and Z digital data to produce X, Y and Z modulation at a rate determined by the numeric value W1 of the writing rate bit field as pointed out above.

When the symbol has been generated, the function generator 16 transmits an end of symbol signal EOS to control section 15 via the CONTROL BUS to signify that X, Y and Z data for the next symbol may now be received. The control section 15 responds thereto to load the X, Y and Z register 14–1 and to issue another symbol start signal SSS. This operation continues until X, Y and Z modulation has been generated for all the symbols contained in a current instruction set. This symbol generation then continues repetitively at the refresh rate.

As pointed out previously, while a particular instruction is being processed, other instructions in the set may be updated or made current. For example, suppose indicator D1 is displaying a symbol set and an operator at indicator D2 requests via I/O devices 12 (for example a keyboard) that the information be presented to D2. The computer 10 responds to this request to format a new display select instruction and a new writing rate instruction for loading register 14–4 and 14–2. These new instructions are then inserted into the instruction set to replace the former D1 and W1 values. When these instruction locations are again addressed, the display generator 13 responds to the new values D2 and W2 to select display D2 and conditions function generator 16 to operate at the W2 rate.

It is to be understood that the foregoing operational sequence is exemplary and that many other modes are possible. For instance, a current instruction set could be updated so as to cause the display generator to access an entirely different instruction set in another segment of the computer memory. A significant advantage of the FIG. 1 embodiment is that the display indicators D1 and D2 can time share the display generator 13 so as to present common or unique sets of symbols and/or video images on both indicators for simultaneous visual observation. This, of course, involves appropriate formatting and interleaving of the instruction set so as to provide display select instructions at appropriate points in the refresh cycle so as to couple the proper indicator channel to the function generator 16 and/or to a video (either radar or television) source (not shown) at the proper times. Graphic or video data can be mixed with graphic or symbolic data for display on a common CRT screen by producing the symbol set during the normal end of sweep dead time interval for the case of radar or during the vertical retrace interval for the case of television. In addition, the symbol set can also be produced on an asynchronous basis by sweep stealing (radar) or line stealing (television) in order to present large amounts of symbolic data. These video mixed mode options are unnecessary to an understanding of the present invention, and are therefore not specifically illustrated.

Figure 2:
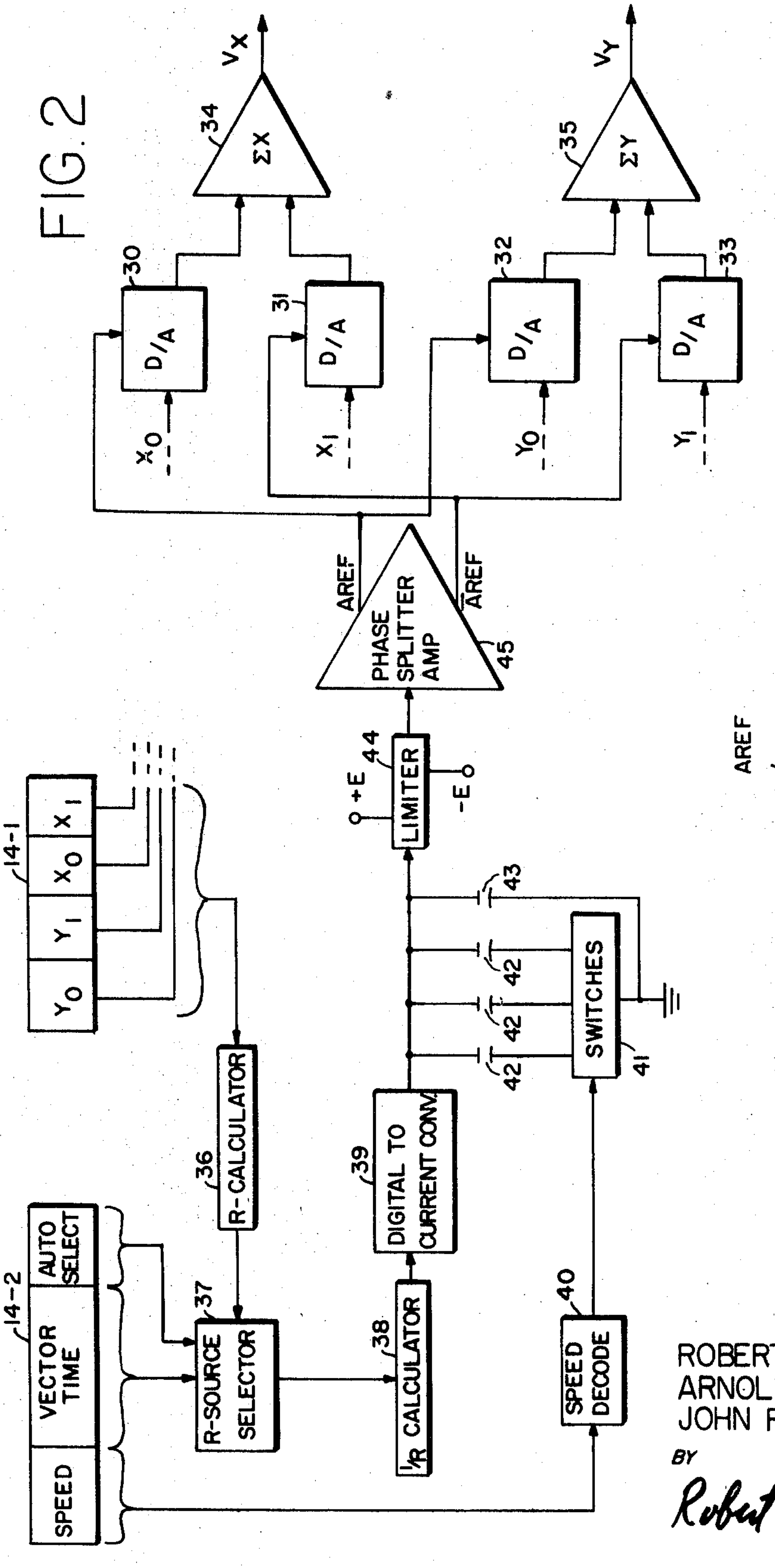
FIG. 2 is a block diagram in part and a circuit schematic diagram in part of a variable rate line generator also embodying the invention.

Although the function generator 16 may include any type of symbol generator, such as a line (or vector), conic, character and other types of symbol generators, the present invention is herein directed to a line generator embodiment which is illustrated in FIG. 2. For an example of a variable rate character generator, reference is made to a copending application entitled Variable Rate Character Generator, Ser. No. 818,015, filed Apr. 21, 1969, by Robert D. Stoddard, Arnold Schumacher, Grant W. Conley and Roy M. Williams, Jr. and assigned to the assignee of the present application.

Referring now to FIG. 2, a line generator is shown to include four digital-to-analog converters (D/A) 30, 31, 32 and 33, each of which may be of the ladder type. The D/A 30 and 31 receive at one input digital numbers X0 and X1, respectively, and D/A s 32 and 33 receive at one input the digital numbers Y0 and Y1, respectively. All of these digital numbers are also shown to be stored in data register 14–1. The numbers X0 and Y0 represent the initial (or present) coordinate of a line (or of the beam position) and X1 and Y1 represent the final or end coordinate. These numbers are routed by means (not shown) to separate ones of the D/A converters as pointed out above. The routing means is not illustrated since it is not essential to an understanding of the line-generating embodiment of this invention. However, one routing means which may be employed is described in copending application Ser. No. 615,094, filed Feb. 10, 1967, U.S. Pat. No. 3,500,332 issued Mar. 10, 1970, entitled "Curve Generator For Oscillographic Display," and assigned to the assignee of the present application of Michael R. Vosbury.

The D/As 30 and 32 also receive at another input a time varying reference voltage, designated A ref. On the other hand, D/A s 31 and 33 also receive another time varying reference voltage $\bar{A}$ ref, where $\bar{A}$ ref is the complement of A ref. According to the prior art, e.g. the above-mentioned Vosbury application, the signals A ref and $\bar{A}$ ref are complementary ramp voltages during line trace or beam positioning periods. The slopes of the ramps are made inversely proportional to the lengths of the lines to be drawn such that the lines will be drawn at constant lineal speed and, therefore, have uniform intensity. Thus, during a tracing or positioning interval, the signals A ref and $\bar{A}$ ref are ramp voltages which are modulated in the D/A s 30–33 according to the values of the associated digital numbers X0, X1, Y0 and Y1. The modulated signals X0 A ref and X1 $\bar{A}$ ref are summed in X-summing amplifier 34 and signals Y0 A ref and Y1 $\bar{A}$ ref are summed in Y-summing amplifier 35. The outputs of these summing amplifiers 34 and 35 are the beam deflection voltage $V_x$ and $V_y$, respectively.

As pointed out above, in prior art display generators, the slope of the reference voltage A ref is made inversely proportional to the length (herein termed R) of a line or vector. This is generally accomplished either (*a*) by employing a single capacitor and constant charging currents, the values of which correspond to the reciprocal of the line lengths or (*b*) by employing a single valued constant charging current and a variable capacitor bank.

The line generator embodying the present invention employs both of these techniques to provide a number of speed or vector writing ranges, in each range of which vectors or lines of different lengths can be drawn at constant velocity.

The vector or line lengths R can be calculated either by means of an R calculator 36 contained in the line generator or by means of the computer 10 (FIG. 1) at the time that the instruction set is formatted and assembled. Thus, the R calculator 36 in FIG. 2 is adapted to receive all of the X and Y coordinate data from the register 14–1. If the value R of the line length (vector time) is calculated in computer 10, this value is inserted in the register 14–2. In FIG. 2 the R value is represented by the Vector Time portion of the register 14–2. It is noted at this point that the vector time code need not be specifically related to the line length R value but may represent other parameters as explained later on. Another portion of the register 14–2 is designated Auto Select and is utilized to designate which source of R value is to be used. To this end, an R source selector 37 responds to the Auto Select bit field to select either the Vector Time value of R or the hardware calculated value of R from calculator 36. In either event the value of R selected by selector 37 is applied to the 1/R calculator 36. The output of the 1/R calculator is a digital number proportional to the reciprocal of R. This number is applied to a digital to constant current converter 39. The output current of the converter 39 has a constant value which value is determined according to the value of the 1/R digital number received at its input.

Also contained in the register 14–2 is a speed bit portion which is applied to a speed decoder 40. The output of the speed decoder 40 consists of a number of digital signals each of which is applied as an on/off control signal to separate ones of a plurality of switches 41. Each of the switches 41 is associated with a separate capacitor 42 such that when a switch is turned on its associated capacitor 42 is connected in circuit between the output of converter 39 and circuit ground. On the other hand, when a switch is turned off its associated capacitor 42 is not so connected.

Figure 3:
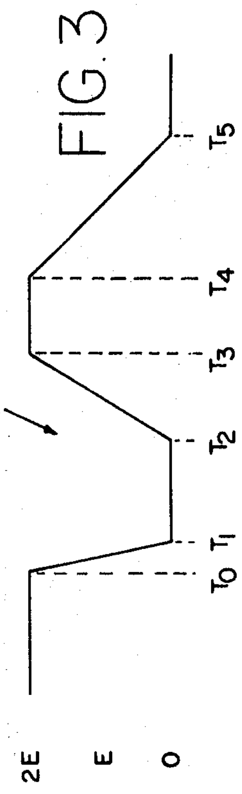
FIG. 3 is a waveform diagram illustrating a valued voltage ramp sequence generated by the FIG. 2 line generator.

A further capacitor 43 is also shown as connected across each serially connected capacitor 42 and associated switch 41. The capacitors 42 and the switches 41 and capacitor 43 then constitute a capacitance bank selectively variable according to the value of the speed bit field. An amplitude limiter 44 limits the amplitude values of the ramp voltage developed across the capacitor bank to ± E volts. The time $\Delta t$ for each ramp is given by $$C\Delta V = I\Delta t \quad (1)$$

where $\Delta V$ is the change in voltage, $C$ is the capacitance and $I$ is the charging current. Because of the limiter 44, the absolute value of $\Delta V$ is constant, but its sign alternates on successive vectors. The capacitor value $C$ is selectable according to the writing range for a selected display. The current value $I$ then is selected according to the line length R, in order to draw different length lines at uniform velocity to achieve uniform brightness. A phase splitting amplifier 45 having an offset of +E volts receives the ramp voltage waveform from limiter 44 and provides the A ref and A ref signals which vary between 0 volt and +2E volts, as illustrated in FIG. 3 for A ref.

In one typical example of the line generator embodiment, there are three speed bits in and six capacitors 42. Table I below gives the relationship between the writing rates.

TABLE I

| Code | Speed Divide by | Position Ramp Time | Vector Time Min. | Vector Time Max. |
|---|---|---|---|---|
| 000 | 1 | 320 nsec. | 1.28 μsec. | 56 μsec. |
| 001 | 2 | 640 nsec. | 2.56 μsec. | 112 μsec. |
| 010 | 4 | 1.28 μsec. | 5.12 μsec. | 224 μsec. |
| 011 | 8 | 2.56 μsec. | 10.24 μsec. | 448 μsec. |
| 100 | 16 | 5.12 μsec. | 20.48 μsec. | 896 μsec. |
| 101 | 32 | 10.24 μsec. | 40.96 μsec. | 1.8 msec. |
| 110 | 64 | 20.48 μsec. | 82 μsec. | 3.6 msec. |
| 111 | 1 | 320 nsec. | 1.28 μsec. | 56 μsec. |

For the "000" condition, only capacitor 43 would be connected across the charging current source 39. That is a binary value of "0" turns a switch 41 off. Thus, for the various conditions listed in table I, the capacitors 42 are connected in various combinations across capacitor 43 to increase the total capacitance to be charged and, hence, the time required to effect a change $\Delta V$ of 2E volts. Referring now to FIG. 3 there is shown a typical waveform A ref. This A ref waveform may also be considered to be the voltage applied to the D/A converters assuming that amplifier 44 has unity gain and an offset of +E volts. In FIG. 3, prior to time $t_0$ A ref has a value of +E volts. In the intervals, $t_0$ to $t_1$, $t_2$ to $t_3$ and $t_4$ to $t_5$, A ref changes from +E to −E (total of 2E volts), from −E to +E and from +E to −E, respectively, This is accomplished (for example) by alternately changing the direction of current flow in charging current source 39. For any selected speed range, the $t_0$ to $t_1$ interval corresponds to a short line or, perhaps, a beam position move. The $t_2$ to $t_3$ and the $t_4$ to $t_5$ intervals correspond to medium and long length vectors, respectively. Of course, for different speed ranges the illustrated time intervals are either shorter or longer, as the case may be. That is the voltage ramps or slopes are steeper for the high-speed indicator than for the lower speed indicators.

As noted in table I above, the various writing ranges are specific fractions or ratios of the highest speed indicator. These ratios are primarily a function of the binary hardware employed. Thus each successive ratio has a different power of two.

Where it is unimportant to employ constant lineal writing speeds to achieve uniform brightness (for example, brightness is separately controlled by Z-axis compensation), the foregoing speed ratios can be modified by a vernier-type control embodying the invention. According to this feature, the vector time number is given a value indicative not of line length R, but rather of a speed or writing rate increment ΔS. Thus, for a selected speed value S in table I, the Indicator writing rate W is given by $$W=S+\Delta S \qquad (2)$$

This feature is significant not only to produce writing rates corresponding to different indicators, but also to provide raster scans at various rates. That is, the line generator can be employed to produce the $Vx$ and $Vy$ deflection voltages needed to achieve a raster scan. The Z-axis unblank signal would be achieved from a separate video source or from a character or line generator employing raster scan principles.

The Z-axis unblank circuitry is not shown in FIG. 2 since it is unnecessary to an understanding of the present invention. Suffice it to say here, that the Z-axis circuitry responds to the slope portions of the bivalued voltage ramp sequence to unblank the CRT beam when a line or vector is to be traced.

There has been described a computer-controlled line generator capable of producing X-, Y- and Z-modulating signals at variable rates. In the illustrated embodiment the generating rate has been shown as dependent on display indicator writing rate. However, it is to be understood that the variable generating rate techniques can be employed in various other manners.

The display generator is capable of being time-shared by plural display indicators having different writing rates as in a multistation display environment. Though illustrated with a cursive writing technique, the variable rate line generator technique is equally applicable to raster scan, dot generating and other writing techniques. Although the illustrated embodiments have been described as driving CRT-type indicators, the invention is also applicable to any type indicator which responds to modulating drive energy in three directions. Thus, display generator apparatus embodying the present invention can be employed to drive X–Y plotter mechanisms having a marking (or imaging) instrument, such as pin, knife, photohead and the like. In such mechanisms, the X and Y signals move the imaging instrument in a plane parallel to the imaging medium (paper, photographic film, and others), while the X-axis signal provides the pin up and down (light beam on and off) information to trace patterns on the medium. The immediately above comments are also applicable to milling machine mechanisms, where the marking instrument is a tool which is urged against and away from a workpiece by the Z-axis modulation. Of course, the instruction set need not be repeated or refreshed for either of the plotter or milling mechanism applications. In addition, where it is desired not to operate in real time, the X-, Y- and Z- axis signals for the plotter or milling machine applications can be formatted in an appropriate numerical control code for storage on a paper or magnetic tape which is later read by the plotter or milling mechanism.

What is claimed is:

1. The combination comprising:

signal-providing means for producing a sequence of different valued constant currents;

ramp-generating means receiving said current sequence to generate a like sequence of voltage ramps which sweep between first and second voltage values and which have different slopes for each different current value; and means coupled to the ramp-generating means for changing the slopes of said voltage ramp sequence.

2. The invention according to claim 1 wherein said ramp-generating means includes a first capacitor coupled to receive said current sequence so as to generate said ramp sequence thereacross; and wherein said means for changing includes a plurality of additional capacitors and switching means for selectively coupling selected ones of said additional capacitors across said first capacitor in predetermined combinations.

3. The invention according to claim 2 wherein signal providing means includes means for providing first and second sets of digital data, means for converting the first set of digital data to said sequence of constant currents; and wherein said switching means responds to the second set of digital data whereby any selected one of said predetermined combinations correspond to the numeric value of the second digital data set.

4. The combination comprising means for providing an instruction set;

line generator means responsive to said instruction set to provide X- and Y-axis modulation signals for application to a display indicator at variable rates, said line generator including 1. signal-producing means responsive to said instruction set to produce first and second sets of digital signals;

2. first conversion means for converting said first signal set to a sequence of constant currents, the values of which are a function of the first signal set, 3. ramp-generating means for receiving said current sequence to generate a like sequence of voltage ramps which sweep between first and second voltage values and which have different slopes for each different current value, 4. second conversion means responding to said first signal set and said voltage ramp sequence to provide said X- and Y-axis signals; and 5. rate varying means responsive to said second signal set and coupled to said ramp generator means to generate said voltage ramp sequence at a rate which corresponds to the numeric value of the second signal set.

5. The invention according to claim 4 wherein said ramp-generating means includes a first capacitor coupled to receive said current sequence so as to generate said ramp sequence thereacross; and wherein said rate-varying means includes a plurality of additional capacitors and switching means which responds to said second signal set to couple selected ones of said additional capacitors across said first capacitor in accordance with the value of said second signal set.

6. Display apparatus comprising:

first and second display indicators responsive to X- and Y-axis modulation to trace lines on their respective display services at first and second writing rates, respectively;

a data source for providing instructions including indicator select fields indicative of said first and second indicators, writing rate fields indicative of said first and second writing rates and line trace fields;

first conversion means for converting said line trace fields to a sequence of constant currents, the values of which are a function of said line trace fields;

a ramp generator for receiving said current sequence to generate a like sequence of voltage ramps which sweep between first and second voltage values and which have different slopes for each different current value;

second conversion means responding to said voltage ramp sequence and said line trace fields to provide X- and Y-axis signals;

rate-varying means responsive to said writing rate field and coupled to said ramp generator to generate said voltage ramp sequence at either said first or said second writing rate; and a display selector switch coupled to said data source and responsive to said indicator select fields to couple said X and Y modulation signals produced at said first and second writing rates to said first and second indicators, respectively.

7. The invention according to claim 6 wherein said ramp generator includes a first capacitor coupled to receive said current sequence so as to generate said voltage ramp sequence thereacross; and wherein said rate-varying means includes a plurality of additional capacitors and switching means which responds to said writing rate field to couple selected ones of said additional capacitors across said first capacitor.